US012541164B2

(12) United States Patent
Wakana

(10) Patent No.: US 12,541,164 B2

(45) Date of Patent: Feb. 3, 2026

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Toru Wakana, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/896,080

(22) Filed: Sep. 25, 2024

(65) Prior Publication Data

US 2025/0110437 A1 Apr. 3, 2025

(30) Foreign Application Priority Data

Oct. 3, 2023 (JP) ................................ 2023-172225

(51) Int. Cl.
*G03G 15/00* (2006.01)

(52) U.S. Cl.
CPC ..... *G03G 15/5029* (2013.01); *G03G 15/5016* (2013.01); *G03G 15/6514* (2013.01)

(58) Field of Classification Search
CPC ........... G03G 15/5016; G03G 15/5029; G03G 15/6502; G03G 15/6514
See application file for complete search history.

(56) References Cited

U.S. PATENT DOCUMENTS

2018/0107146 A1* 4/2018 Shinohara .......... G03G 15/6552
2022/0179347 A1* 6/2022 Maruyama ......... G03G 15/6573
2023/0156127 A1* 5/2023 Kimata .............. H04N 1/00079 358/1.13

FOREIGN PATENT DOCUMENTS

JP 2020192716 A 12/2020

* cited by examiner

*Primary Examiner* — Hoang X Ngo

(74) *Attorney, Agent, or Firm* — Canon U.S.A., Inc. IP Division

(57) ABSTRACT

An image forming apparatus and method include, in a case where sheet type designation information in a print job designates automatic detection, a sheet type automatic detection setting is enabled and a sheet type in a setting for a feed unit is unspecified, detect a sheet type of a sheet on the feed unit on a conveyance path, and control printing to be performed on the sheet conveyed from the feed unit based on the detected sheet type, and, in a case where the sheet type designation information in the print job designates the automatic or the automatic detection, the sheet type automatic detection setting is enabled, and the sheet type in the setting for the feed unit is specified, control the printing to be performed on the sheet conveyed from the feed unit based on the specified sheet type.

13 Claims, 7 Drawing Sheets

FIG.5

| FEED TRAY | SHEET SIZE | SHEET TYPE |
|---|---|---|
| FEED TRAY 1 | A4 | PLAIN PAPER 1 |
| FEED TRAY 2 | A4 | PLAIN PAPER 2 |
| FEED TRAY 3 | A4 | PLAIN PAPER 3 |
| FEED TRAY 4 | A4 | PLAIN PAPER 4 |
| MANUAL FEED TRAY | A4 | UNSPECIFIED |

FIG.6

| FEED TRAY | SHEET SIZE | SHEET TYPE |
|---|---|---|
| FEED TRAY 1 | A4 | PLAIN PAPER 1 |
| FEED TRAY 2 | A4 | PLAIN PAPER 2 |
| FEED TRAY 3 | A4 | PLAIN PAPER 3 |
| FEED TRAY 4 | A4 | PLAIN PAPER 4 |
| MANUAL FEED TRAY | A4 | PLAIN PAPER 5 |

IMAGE FORMING APPARATUS, METHOD FOR CONTROLLING IMAGE FORMING APPARATUS, AND STORAGE MEDIUM

BACKGROUND

Field

The present disclosure relates to an image forming apparatus, a method for controlling the image forming apparatus, and a storage medium.

Description of the Related Art

There is a known sheet type automatic detection function capable of sensing a sheet type using a sensor mounted to a feed tray of an image forming apparatus. The sheet type automatic detection function can sense the sheet type of a sheet stored on the feed tray of the image forming apparatus at the time of feeding the sheet. Use of the sheet type automatic detection function enables skipping an operation of inputting the sheet type of the sheet stored on the feed tray via an operation screen of the image forming apparatus.

Japanese Patent Application Laid-Open No. 2020-192716 discusses a technique that continues a print job based on a setting corresponding to a sheet type detected by a sensor if a condition is satisfied in a case where the sheet type set via an operation panel does not match the sheet type detected by the sensor.

The sheet feeding time is longer in a case where the sheet type automatic detection function is used to sense a sheet type than that in a case where the sheet type automatic detection function is not used. For example, there are image forming apparatuses that take approximately 10 to 20 seconds to feed a sheet when using this approach.

In a case where a setting to use the sheet type automatic detection function is set for a print job, the sheet type automatic detection function operates each time, which can lead to a decrease in productivity.

In a case where the setting to use the sheet type automatic detection function is set for a print job while the sheet type automatic detection function is disabled in the image forming apparatus, the print job can stop due to a sheet mismatch.

SUMMARY

The present disclosure is directed to improving productivity by detecting the sheet type of a sheet on a feed unit as appropriate.

According to an aspect of the present disclosure, an image forming apparatus that controls printing based on a print job including sheet type designation information configured to designate at least automatic or automatic detection includes a memory storing a program and a processor that when executing the program is configured to set a sheet type automatic detection setting to enabled or disabled, in a case where the sheet type designation information in the print job designates the automatic or the automatic detection, the sheet type automatic detection setting is enabled and a sheet type in a setting for a feed unit is unspecified, detect a sheet type of a sheet on the feed unit on a conveyance path, specify the sheet type in the setting for the feed unit, and control the printing to be performed on the sheet conveyed from the feed unit based on the specified sheet type, and, in a case where the sheet type designation information in the print job designates the automatic or the automatic detection, the sheet type automatic detection setting is enabled, and the sheet type in the setting for the feed unit is specified, control the printing to be performed on the sheet conveyed from the feed unit based on the specified sheet type without detecting the sheet type of the sheet on the feed unit on the conveyance path.

Further features of the present disclosure will become apparent from the following description of exemplary embodiments with reference to the attached drawings.

BRIEF DESCRIPTION OF THE DRAWINGS

FIG. 5 is a diagram illustrating an example of sheet settings for each feed tray.

FIG. 6 is a diagram illustrating an example of sheet settings for each feed tray.

DESCRIPTION OF THE EMBODIMENTS

Various exemplary embodiments will be described below with reference to the drawings.

Figure 1:
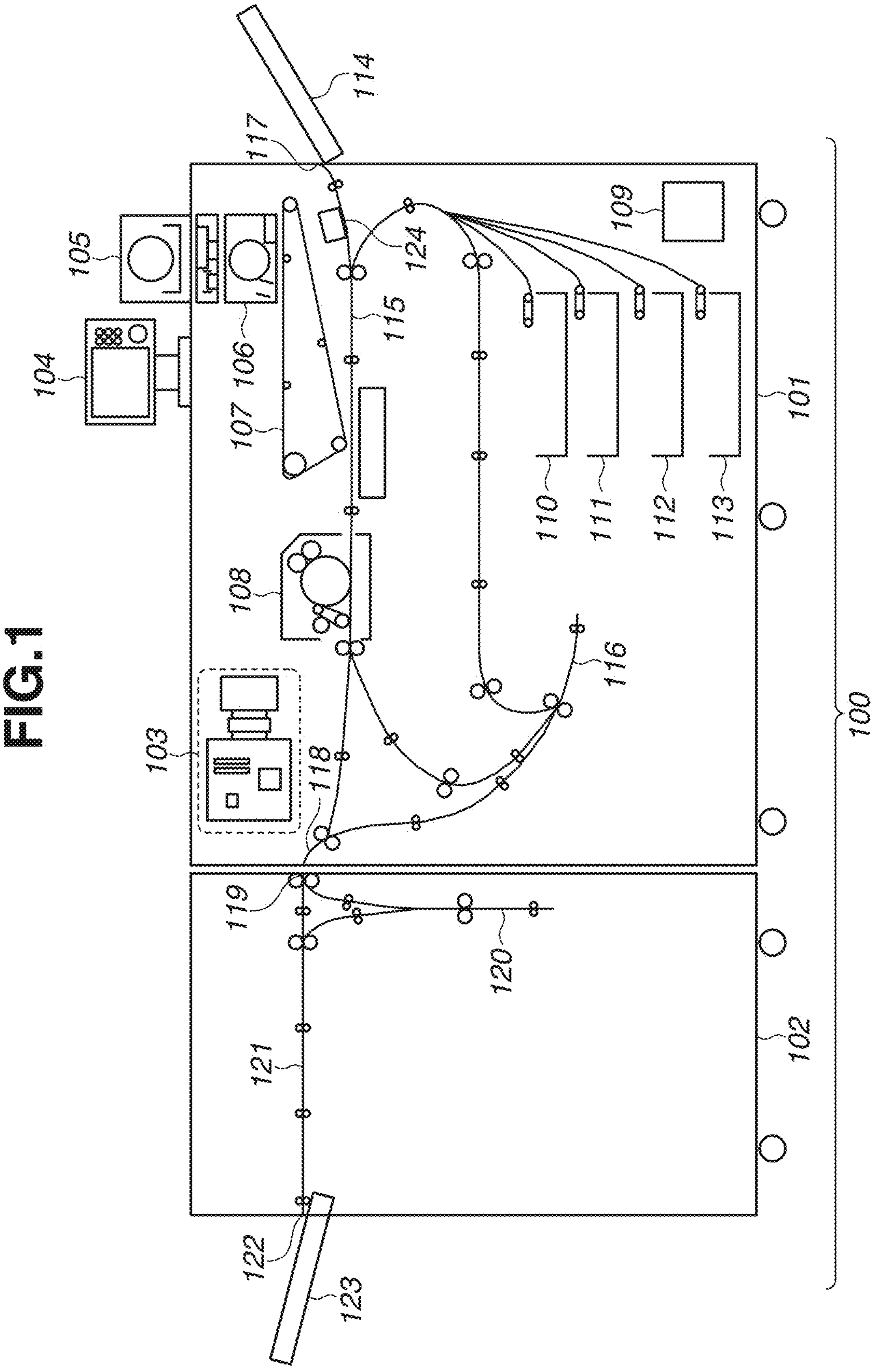
FIG. 1 is a diagram illustrating an example of the configuration of an image forming apparatus.

FIG. 1 is a diagram illustrating an example of the configuration of an image forming apparatus 100 according to an exemplary embodiment. The image forming apparatus 100 includes a printing apparatus 101 and a finisher 102. The printing apparatus 101 forms and prints images. The finisher 102 includes sheet ejection destinations for sheets printed by the printing apparatus 101.

A control unit 103 executes software for performing various types of control of the image forming apparatus 100.

An operation unit 104 is used for issuing operation instructions to the image forming apparatus 100. The operation unit 104 includes a touch panel and hardware keys. The operation unit 104 can display information about the image forming apparatus 100, and settings can be input using the touch panel and the hardware keys.

A toner supply unit 105 supplies toner, which is a printing agent, to an image forming unit 106 of the image forming apparatus 100. The toner supply unit 105 includes door that can open and close, where an operator can supply toner by using the door. The image forming unit 106 forms an image.

The image forming unit 106 performs a process of forming an image specified by a print job using toner supplied from the toner supply unit 105 and transferring the formed image onto an intermediate transfer belt 107. The transferred image on the intermediate transfer belt 107 is transferred onto a sheet.

A fixing device 108 fixes the toner to the sheet by heating and pressing the sheet with the image transferred from the intermediate transfer belt 107.

The toner that is not transferred from the intermediate transfer belt 107 onto the sheet is accumulated in an excess toner collection unit 109.

Feed units 110, 111, 112, 113, and 114 are units for feeding sheets.

A sheet fed from the feed unit 110, 111, 112, 113, or 114 is conveyed through a sheet conveyance portion 115 and undergoes a toner transferring and fixing process.

A switchback portion 116 reverses sheets. A sheet feed inlet 117 feeds sheets from the external feed unit 114 (the external feed unit 114 will be referred to as a feed unit 114 or a manual feed tray 114 hereinafter).

A sheet ejection unit 118 ejects sheets through the fixing process to the finisher 102.

A feed inlet 119 of the finisher 102 receives sheets from the printing apparatus 101. A switchback portion 120 reverses sheets.

A sheet received from the feed inlet 119 of the finisher 102 is ejected to an ejection unit 122 through a conveyance unit 121 and stacked on an ejection tray 123.

The sheet type of a sheet conveyed from the feed unit 114 is automatically identified using a media sensor unit 124.

Figure 2:
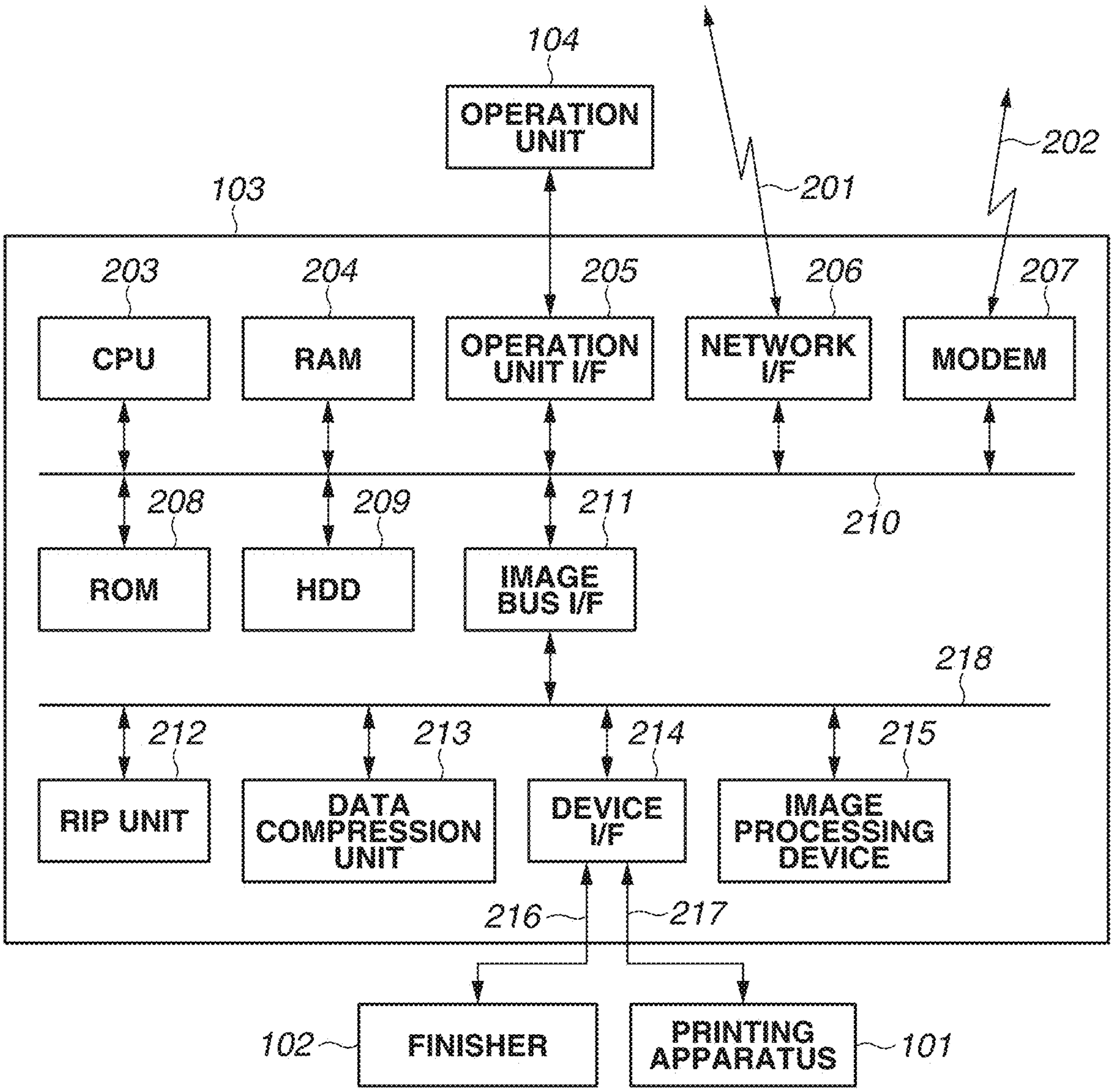
FIG. 2 is a block diagram illustrating an example of the configuration of a control unit of the image forming apparatus.

FIG. 2 is a block diagram illustrating an example of a configuration of the control unit 103 of the image forming apparatus 100. The image forming apparatus 100 includes the printing apparatus 101, the finisher 102, the control unit 103, and the operation unit 104.

The control unit 103 includes a central processing unit (CPU) 203, a random access memory (RAM) 204, an operation unit interface 205, a network interface 206, a modem 207, a read-only memory (ROM) 208, a hard disk drive (HDD) 209, a CPU bus 210, and an image bus interface 211. The control unit 103 also includes a rasterizing (raster image processor (RIP)) unit 212, a data compression unit 213, a device interface 214, an image processing device 215, and an image bus 218.

A network 201 connects the image forming apparatus 100 to external devices. A telephone line 202 connects the image forming apparatus 100 to external devices. The CPU 203 executes programs for controlling the control unit 103.

The RAM 204 is managed by programs executed by the CPU 203. The RAM 204 is used as a reception buffer for temporarily storing data received from external sources, and as an image data buffer for temporarily storing image data rasterized by the RIP unit 212.

The operation unit interface 205 connects the control unit 103 to the operation unit 104. The network interface 206 connects the control unit 103 to the network 201. The modem 207 is an interface that connects the control unit 103 to the telephone line 202.

The ROM 208 stores programs that are executed by the CPU 203 and data. The HDD 209 is a non-volatile storage device that can store various pieces of data for an extended period of time.

The image bus interface 211 connects the CPU bus 210 and the image bus 218.

The rasterizing (RIP) unit 212 includes a function of converting page description language (PDL) data input from an external source into bitmap image data.

The data compression unit 213 compresses data. The device interface 214 connects the printing apparatus 101 and the finisher 102 to the image bus 218 via data buses 216 and 217.

The image processing device 215*r* performs various types of image processing on bitmap image data generated by the RIP unit 212. The CPU 203 performs printing while issuing commands for performing printing to the printing apparatus 101 and the finisher 102 via the data buses 216 and 217 based on instruction signals from the operation unit 104 or an external device via the network 201.

The image bus 218 is connected to above described hardware elements for performing image processing.

The media sensor unit 124 in FIG. 1 includes, for example, a light emitting diode (LED) as a light emitting element and a photodiode as a light receiving element. The media sensor unit 124 detects the amount of reflected light from the light emitted by the LED using the photodiode. The CPU 203 controls to convey a sheet on the feed unit 114 to a position corresponding to the media sensor unit 124 on a conveyance path and detects the sheet type of the sheet from the feed unit 114 on the conveyance path based on a detection signal of the media sensor unit 124.

The CPU 203 detects the sheet type based on the detection signal of the media sensor unit 124. The detection signal varies based on surface properties and thickness of each sheet. The CPU 203 optimally controls the image forming speed and the fixing temperature of the fixing device 108 based on the detected sheet type. The sheet type is, for example, plain paper, thin paper, or thick paper.

The CPU 203 controls the image forming speed to perform image forming and conveyance at a predetermined speed for each material. For example, when the image forming speed (conveyance speed) for plain paper and thin paper is 1, the image forming on thick paper is performed at a speed of ½. The CPU 203 controls the fixing temperature of the fixing device 108 so that the fixing temperature for thin paper is lower than the fixing temperature for plain paper and the fixing temperature for thick paper is higher than the fixing temperature for plain paper.

Figure 3:
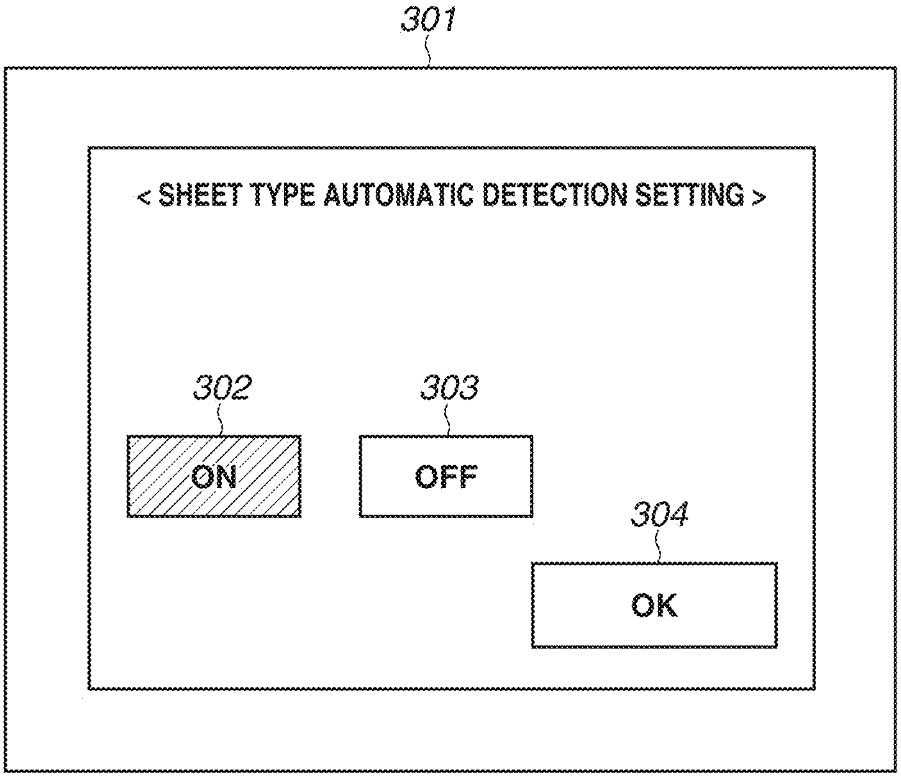
FIG. 3 is a diagram illustrating a setting screen for a sheet type automatic detection setting.

FIG. 3 is a diagram illustrating a setting screen for setting a sheet type automatic detection setting. The setting screen is displayed on the operation unit 104.

A setting screen 301 is a setting screen for setting the sheet type automatic detection setting and is displayed on the touch panel of the operation unit 104. An ON key 302 enables the sheet type automatic detection setting. An OFF key 303 enables disabling the sheet type automatic detection setting.

In FIG. 3, the ON key 302 is displayed as grayed out, indicating that the sheet type automatic detection setting is set to ON.

An OK key 304 enables the screen setting and, at the same time, closing the setting screen 301.

The setting value of the sheet type automatic detection setting is stored in the RAM 204 when the OK key 304 is selected.

Figure 4:
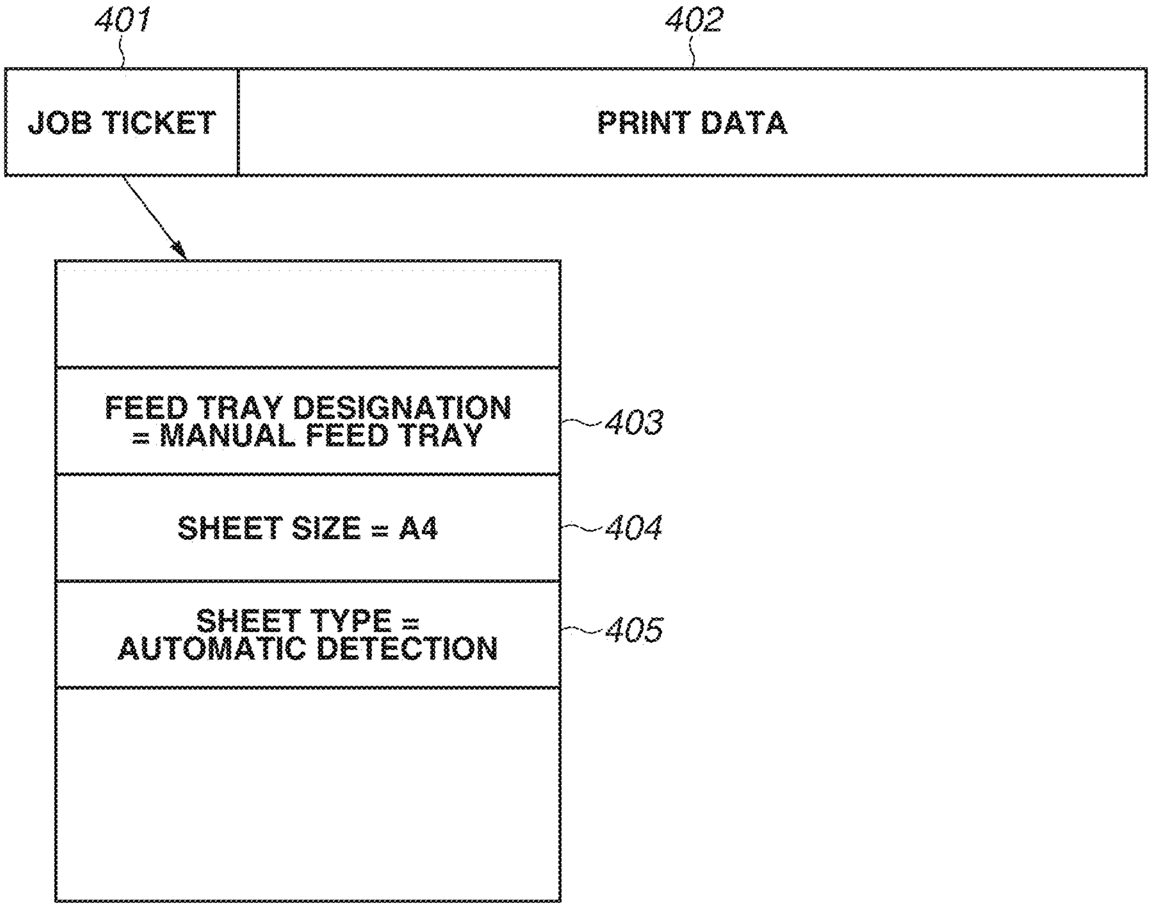
FIG. 4 is a diagram illustrating an example of print job settings.

FIG. 4 is a diagram illustrating an example of a data structure of a print job. In FIG. 4, PDL data input from an external device, such as a host computer, via the network 201 is illustrated as an example of a print job. The print job can be a copy job read by a reading device (not illustrated) of the image forming apparatus 100 or a print job stored temporarily in a storage device, such as the HDD 209 or the RAM 204.

The print job includes a job ticket section 401 and a print data section 402. The job ticket section 401 is where print settings, such as feed tray designation, sheet size designation, and sheet type designation, are configured. According to the present exemplary embodiment, the job ticket section 401 is described in a job control language.

According to the present exemplary embodiment, the print data section 402 is data described in a PDL. The print data section 402 can be a copy job read by the reading device (not illustrated) or a print job stored temporarily in the storage device (such as the HDD 209 or the RAM 204) as described above.

Feed tray designation information 403 in the job ticket section 401 indicates a feed tray designation of the print settings. In the example illustrated in FIG. 4, "manual feed tray" is set as the feed tray designation. According to the present exemplary embodiment, "feed tray 1", "feed tray 2", "feed tray 3", "feed tray 4", or "manual feed tray" can be set as the feed tray designation (see FIG. 5).

Sheet size designation information 404 in the job ticket section 401 indicates a sheet size designation of the print settings. In the example illustrated in FIG. 4, "A4" is set as the sheet size designation.

Sheet type designation information 405 in the job ticket section 401 indicates a sheet type designation of the print settings. In the example illustrated in FIG. 4, "automatic detection" is set as the sheet type designation. According to the present exemplary embodiment, "automatic detection", "automatic", "plain paper 1", "plain paper 2", "plain paper 3", "plain paper 4", or "plain paper 5" can be set as the sheet type designation (see also FIG. 5).

FIG. 5 is a diagram illustrating an example of sheet settings for each feed tray. Feed trays 1 to 4 correspond to the feed units 110 to 113 in FIG. 1. A manual feed tray corresponds to the feed unit 114 in FIG. 1.

Each sheet setting indicates a combination of a sheet size and a sheet type. The sheet setting indicates that the sheet type for the manual feed tray is "unspecified". The "unspecified" indicates a state where no detection is performed by the sheet type automatic detection function of the media sensor unit 124 in FIG. 1. The sheet settings are stored in the HDD 209.

The sheet size "A4" and the sheet type "plain paper 1" are set as the sheet setting for the feed tray 1.

The sheet size "A4" and the sheet type "plain paper 2" are set as the sheet setting for the feed tray 2.

The sheet size "A4" and the sheet type "plain paper 3" are set as the sheet setting for the feed tray 3.

The sheet size "A4" and the sheet type "plain paper 4" are set as the sheet setting for the feed tray 4.

The sheet size "A4" and the sheet type "unspecified" are set as the sheet setting for the manual feed tray.

FIG. 6 is a diagram illustrating an example of other sheet settings for each feed tray. Each sheet setting indicates a combination of a sheet size and a sheet type. The sheet settings are stored in the HDD 209.

The sheet size "A4" and the sheet type "plain paper 1" are set as the sheet setting for the feed tray 1.

The sheet size "A4" and the sheet type "plain paper 2" are set as the sheet setting for the feed tray 2.

The sheet size "A4" and the sheet type "plain paper 3" are set as the sheet setting for the feed tray 3.

The sheet size "A4" and the sheet type "plain paper 4" are set as the sheet setting for the feed tray 4.

The sheet size "A4" and the sheet type "plain paper 5" are set as the sheet setting for the manual feed tray.

Figure 7:
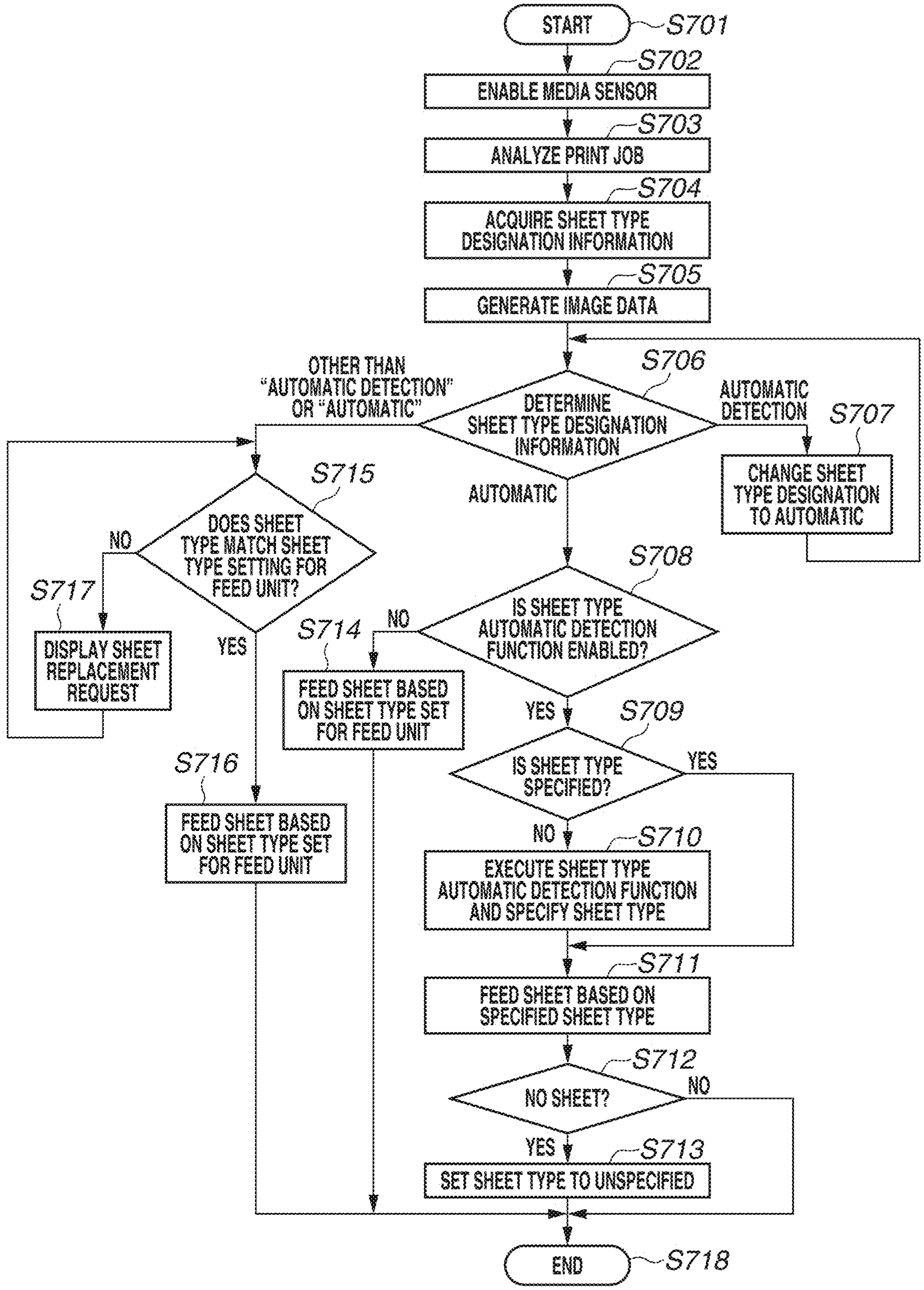
FIG. 7 is a flowchart illustrating a method for controlling the image forming apparatus.

FIG. 7 is a flowchart illustrating a method for controlling the image forming apparatus 100 according to the present exemplary embodiment. For the purposes of the following discussion of the flowchart illustrated in FIG. 7, the image forming apparatus 100 controls printing based on the print job discussed above with respect to FIG. 4. The CPU 203 executes a program to carry out the process in FIG. 7.

In step S701, the CPU 203 starts the process.

In step S702, the CPU 203 configures the setting of the media sensor unit 124 to enable (the ON key 302 in FIG. 3) or disable (the OFF key 303 in FIG. 3) the sheet type automatic detection setting based on an instruction from the sheet type automatic detection setting screen (FIG. 3) displayed on the operation unit 104. The setting value (the ON key 302 or OFF key 303 in FIG. 3) of the sheet type automatic detection setting is stored in the RAM 204.

In step S703, the CPU 203 analyzes the print job. The CPU 203 receives the print job via the network 201 and stores the received print job in the HDD 209. The CPU 203 then reads the print job stored in the HDD 209 and analyzes the print job. Then, the CPU 203 reads the feed tray designation information 403, the sheet size designation information 404, and the sheet type designation information 405 from the job ticket section 401 (FIG. 4) in the print job and stores all the read information in the HDD 209. The CPU 203 also analyzes the PDL data in the print data section 402 (FIG. 4) in the print job, converts the PDL data into intermediate data (not illustrated), and stores the intermediate data in the HDD 209.

In step S704, the CPU 203 acquires the sheet type designation information 405. The CPU 203 acquires the sheet type designation information 405 (step S703) read from the job ticket section 401 (FIG. 4) in the print job and stores the acquired sheet type designation information 405 in the RAM 204.

The sheet type designation information 405 can designate "automatic detection", "automatic", or a sheet type that the image forming apparatus 100 can feed, and at least "automatic detection" or "automatic" can be designated. According to the present exemplary embodiment, the sheet types that the image forming apparatus 100 can feed are "plain paper 1", "plain paper 2", "plain paper 3", "plain paper 4", and "plain paper 5".

The setting "automatic detection" is a setting for explicitly instructing the use of the media sensor unit 124 and operating the media sensor unit 124 at the time of feeding a sheet and is a setting for instructing a detection of the sheet type of the sheet on the manual feed tray 114 to be performed. The setting "automatic" is a setting for automatically determining whether to use the media sensor unit 124 and is a setting without an instruction about whether to perform detection of the sheet type of the sheet on the manual feed tray 114.

In step S705, the CPU 203 reads the generated intermediate data (step S703) from the HDD 209, generates image data (not illustrated) using the RIP unit 212, and stores the generated image data in the HDD 209.

In step S706, the CPU 203 reads the acquired sheet type designation information 405 (step S704) from the RAM 204 and determines the sheet type designation information 405. If the CPU 203 determines that "automatic detection" is designated in the sheet type designation information 405 (AUTOMATIC DETECTION in step S706), the processing proceeds to step S707. If the CPU 203 determines that "automatic" is designated in the sheet type designation information 405 (AUTOMATIC in step S706), the processing proceeds to step S708. If the CPU 203 determines that a setting other than "automatic detection" or "automatic" is designated in the sheet type designation information 405 (OTHER THAN "AUTOMATIC DETECTION" or "AUTOMATIC" in step S706), the processing proceeds to step S715.

The setting other than "automatic detection" and "automatic" refers to a sheet type that the image forming apparatus 100 can feed. According to the present exemplary embodiment, the setting other than "automatic detection" or "automatic" refers to "plain paper 1", "plain paper 2", "plain paper 3", "plain paper 4", or "plain paper 5".

In step S707, the CPU 203 functions changes the sheet type designation information 405 from "automatic detection" to "automatic" and stores the changed sheet type designation information 405 in the RAM 204, and the processing returns to step S706. The change causes the subsequent processing to be performed with the sheet type designation information 405 designating "automatic", enabling using the sheet type automatic detection function of the media sensor unit 124 in FIG. 1 only as appropriate instead of using the sheet type automatic detection function each time a sheet is fed. The CPU 203 stores, in the RAM 204, information indicating the rewriting of the sheet type designation information 405 from "automatic detection" to "automatic".

In step S708, the CPU 203 determines whether the use of the sheet type automatic detection function illustrated in FIG. 3 is enabled. The CPU 203 acquires the setting value (step S702) of the sheet type automatic detection setting from the RAM 204. The CPU 203 determines the acquired setting value of the sheet type automatic detection setting. If the acquired setting value of the sheet type automatic detection setting is enabled (ON), the CPU 203 determines that the sheet type automatic detection function is enabled (YES in step S708), and the processing proceeds to step S709. If the acquired setting value of the sheet type automatic detection setting is disabled (OFF), the CPU 203 determines that the sheet type automatic detection function is disabled (NO in step S708), and the processing proceeds to step S714.

In step S709, the CPU 203 determines whether the sheet type of the sheet in the setting for the manual feed tray 114 is in a specified state. The CPU 203 reads the sheet setting (FIG. 5 or 6) from the HDD 209 and determines whether the sheet type for the manual feed tray 114 in the sheet setting (FIG. 5 or 6) is "unspecified".

If the sheet type for the manual feed tray 114 is "unspecified", the CPU 203 determines that the sheet type in the setting for the manual feed tray 114 is in an unspecified state. If the sheet type for the manual feed tray 114 is not "unspecified", the CPU 203 determines that the sheet type in the setting for the manual feed tray 114 is in a specified state. The sheet type that is "unspecified" refers to a state where no sheet type is specified by the sheet type automatic detection function of the media sensor unit 124, even though the sheet type automatic detection function is to specify the sheet type.

If the CPU 203 determines that the sheet type for the manual feed tray 114 is "unspecified" (NO in step S709), the processing proceeds to step S710. If the CPU 203 determines that the sheet type for the manual feed tray 114 is not "unspecified" (YES in step S709), the processing proceeds to step S711.

According to the present exemplary embodiment, if the sheet setting is, for example, as illustrated in FIG. 5, the sheet type for the manual feed tray 114 is "unspecified", and the processing proceeds to step S710. If the sheet setting is, for example, as illustrated in FIG. 6, the sheet type for the manual feed tray 114 is "plain paper 5" and is determined to not be "unspecified", and the processing proceeds to step S711.

In step S710, the CPU 203 detects the sheet type of the sheet on the manual feed tray 114 on the conveyance path using the sheet type automatic detection function of the media sensor unit 124. The CPU 203 controls to convey the sheet stored on the manual feed tray 114 to the media sensor unit 124 and detects the sheet type of the sheet on the manual feed tray 114 using the media sensor unit 124.

According to the present exemplary embodiment, the detected sheet type herein is "plain paper 5".

The CPU 203 reads the sheet setting (FIG. 5) from the HDD 209, updates the sheet type for the manual feed tray 114 with "plain paper 5", and specifies the sheet type in the setting for the manual feed tray 114. The CPU 203 stores the updated sheet setting (FIG. 6) in the HDD 209. Thereafter, the processing proceeds to step S711.

In step S711, the CPU 203 controls to feed the sheet stored on the manual feed tray 114 based on control parameters (e.g., conveyance speed, fixing temperature) for the specified sheet type (step S710) for the manual feed tray 114. The CPU 203 reads the generated image data (step S705) from the HDD 209. Then, the CPU 203 converts the image data read from the HDD 209 into a video signal and performs control to print on the sheet conveyed from the manual feed tray 114 based on the control parameters (e.g., conveyance speed, fixing temperature) for the sheet type for the manual feed tray 114.

In step S712, the CPU 203 determines whether a sheet is on the manual feed tray 114. This is to determine whether a sheet remains on the manual feed tray 114 after the sheet feeding (step S711). The determination is performed using a sensor (not illustrated) mounted to the manual feed tray 114.

If the CPU 203 determines that no sheet is on the manual feed tray 114 (YES in step S712), the processing proceeds to step S713. If the CPU 203 determines that a sheet is on the manual feed tray 114 (NO in step S712), the processing proceeds to step S718.

In step S713, the CPU 203 changes (sets) the sheet type of the sheet for the manual feed tray 114 in the sheet setting (FIG. 6) to "unspecified", which results in the sheet setting (FIG. 5). The "unspecified" refers to a state of not being specified. Since the manual feed tray 114 is currently in a state without a sheet, the foregoing processing is performed so that when a new sheet is put on the manual feed tray 114, a sheet type will be specified again using the sheet type automatic detection function.

The CPU 203 reads the sheet setting (FIG. 6) from the HDD 209 and changes the sheet type for the manual feed tray 114 to "unspecified". The CPU 203 stores the changed sheet setting (FIG. 5) in the HDD 209. The CPU 203 can return the sheet type designation information 405 to "automatic detection" based on the information indicating the rewriting of the sheet type designation information 405 stored in the RAM 204 from "automatic detection" to "automatic" (step S707).

When the sheet type designation information 405 is changed from "automatic detection" to "automatic" in step S707, the CPU 203 returns the sheet type designation information 405 from "automatic" to "automatic detection". This is performed to enable re-executing the print job on the screen on the operation unit 104 of the image forming apparatus 100. Thereafter, the processing proceeds to step S718.

In step S714, the CPU 203 reads the sheet setting (FIG. 6) from the HDD 209 and specifies the sheet type for the manual feed tray 114. While there are a case where the sheet setting is as illustrated in FIG. 5 and a case where the sheet setting is as illustrated in FIG. 6, the sheet type automatic detection function is disabled (step S708), so that the sheet setting is as illustrated in FIG. 6.

The CPU 203 specifies "plain paper 5" as the sheet type for the manual feed tray 114 based on the sheet setting (FIG. 6). The CPU 203 controls to feed the sheet stored on the manual feed tray 114 based on the control parameters (e.g., a conveyance speed, a fixing temperature) for the specified sheet type ("plain paper 5") for the manual feed tray 114. Then, the CPU 203 reads the generated image data (step S705) from the HDD 209. The CPU 203 then converts the image data read from the HDD 209 into a video signal and performs control to print on the sheet conveyed from the manual feed tray 114 based on the control parameters (e.g., a conveyance speed, a fixing temperature) for the sheet type ("plain paper 5") for the manual feed tray 114. Thereafter, the processing proceeds to step S718.

In step S715, the CPU 203 reads the sheet type designation information 405 (step S704) from the RAM 204. The CPU 203 reads the sheet setting information (FIG. 5 or 6) from the HDD 209. Then, the CPU 203 compares the sheet type designation information 405 (step S704) and the sheet setting information (FIG. 5 or 6).

If the CPU 203 determines that the sheet type in the sheet type designation information 405 (step S704) matches the sheet type for the manual feed tray 114 in the sheet setting information (FIG. 5 or 6) (YES in step S715), the processing proceeds to step S716. If the CPU 203 determines that the sheet type in the sheet type designation information 405 (step S704) does not match the sheet type for the manual feed tray 114 in the sheet setting information (FIG. 5 or 6) (NO in step S715), the processing proceeds to step S717.

According to the present exemplary embodiment, "plain paper 5" is stored as the sheet type designation information 405 (step S704) in the RAM 204. If the sheet setting information read from the HDD 209 is, for example, as illustrated in FIG. 6, the sheet type for the manual feed tray 114 is "plain paper 5". Thus, the CPU 203 determines that the sheet types match, and the processing proceeds to step S716.

If the sheet setting information read from the HDD 209 is, for example, as illustrated in FIG. 5, the sheet type for the manual feed tray 114 is "unspecified". Thus, the CPU 203 determines that the sheet types do not match, and the processing proceeds to step S717.

In step S717, since the sheet types are determined not to match (step S716), the CPU 203 controls a sheet replacement request (not illustrated) to be displayed on the operation unit 104. If a new sheet is set on the manual feed tray 114, the CPU 203 clears the display of the sheet replacement request (not illustrated) on the operation unit 104. The CPU 203 then determines that information about the new sheet set on the manual feed tray 114 is input to a screen (not illustrated) on the operation unit 104. The CPU 203 reads the sheet setting information (FIG. 5 or 6) from the HDD 209, updates the sheet setting information (FIG. 5 or 6) with the input sheet information, and stores the updated sheet setting information in the HDD 209. Then, the processing returns to step S715. If, for example, the sheet type in the input sheet information is "plain paper 5", the updated sheet setting information is as illustrated in FIG. 6.

In step S716, the CPU 203 controls to feed the sheet stored on the manual feed tray 114 based on the control parameters (e.g., a conveyance speed, a fixing temperature) for the matched sheet type ("plain paper 5" according to the present exemplary embodiment) for the manual feed tray 114. Then, the CPU 203 reads the generated image data (step S705) from the HDD 209. The CPU 203 then converts the image data read from the HDD 209 into a video signal and performs control to print on the sheet conveyed from the manual feed tray 114 based on the control parameters (e.g., a conveyance speed, a fixing temperature) for the sheet type for the manual feed tray 114. The processing then proceeds to step S718.

In step S718, the process illustrated in the flowchart in FIG. 7 ends.

The advantage the processing in step S707 provides will now be described. In one example of the absence of step S707, if the sheet type designation information 405 in a print job designates "automatic detection", the CPU 203 detects the sheet type on the manual feed tray 114 each time using the media sensor unit 124 as in step S710, which can lead to a decrease in productivity.

In another example of the absence of step S707, the sheet type designation information 405 in a print job designates "automatic detection", and the setting value of the sheet type automatic detection setting in FIG. 3 is OFF. In this case, the CPU 203 stops printing processing due to a mismatch between "automatic detection" in the sheet type designation information 405 and the sheet type "plain paper 5" set for the manual feed tray in FIG. 6.

An effect of the present exemplary embodiment will now be described. According to the present exemplary embodiment, in step S707, the CPU 203 changes the sheet type designation information 405 in the print job from "automatic detection" to "automatic", the processing returns to step S706, and then proceeds to step S708.

For example, immediately after a sheet is set on the manual feed tray 114, the sheet type for the manual feed tray 114 in the sheet setting information is changed to "unspecified" as illustrated in FIG. 5. In this case, the processing proceeds from step S709 to step S710. In step S710, the CPU 203 detects the sheet type of the sheet on the manual feed tray 114 using the media sensor unit 124 and updates the sheet setting information in FIG. 5 with the sheet setting information in FIG. 6.

A case where a new print job in which the sheet type designation information 405 designates "automatic detection" is input thereafter will be described. In this case, in step S709, since the sheet type for the manual feed tray 114 in the sheet setting information in FIG. 6 is "plain paper 5", the processing proceeds to step S711 without performing the processing of the media sensor unit 124 in step S710.

As described above, according to the present exemplary embodiment, when the sheet type designation information 405 in a print job designates "automatic detection", the processing of the media sensor unit 124 is performed for the first print job but is not performed for the second and subsequent print jobs. This enables reducing the number of times of the processing of the media sensor unit 124, which results in improved productivity.

When the sheet type designation information 405 in a print job designates "automatic detection" and the setting value of the sheet type automatic detection setting in FIG. 3 is OFF, the processing proceeds to step S714 via steps S707, S706, and S708, and printing processing is performed. This enables preventing the printing processing from stopping due to a sheet type mismatch.

According to the present exemplary embodiment, the sheet type automatic detection function can be used even when the sheet type designation information 405 in a print job designates "automatic detection", thus, preventing a decrease in productivity caused by an activation of the sheet type automatic detection function.

Other Exemplary Embodiments

The present disclosure can also be implemented by a process in which a program for carrying out one or more functions of the above-described exemplary embodiment is supplied to a system or an apparatus via a network or a storage medium and one or more processors of a computer of the system or the apparatus read the program and execute the read program. The present disclosure can also be implemented with a circuit (e.g., application-specific integrated circuit (ASIC)) configured to carry out one or more functions.

The exemplary embodiments described above are merely illustrations of specific examples of the implementation of the present disclosure, and the technical scope of the present disclosure should not be interpreted narrowly to only the above-described exemplary embodiments. Specifically, the present disclosure can be implemented in various forms without departing from the technical concept or main features of the present disclosure.

The present disclosure of the exemplary embodiments encompasses the following configurations, method, and program.

Configuration 1

1. An image forming apparatus that controls printing based on a print job including sheet type designation information configured to designate at least automatic or automatic detection, the image forming apparatus comprising:

at least one memory storing a program; and at least one processor, the at least one processor that when executing the program is configured to cause the image forming apparatus to:

set a sheet type automatic detection setting to enabled or disabled;

in a case where the sheet type designation information in the print job designates the automatic or the automatic detection, the sheet type automatic detection setting is enabled and a sheet type in a setting for a feed unit is unspecified, detect a sheet type of a sheet on the feed unit on a conveyance path, specify the sheet type in the setting for the feed unit, and control the printing to be performed on the sheet conveyed from the feed unit based on the specified sheet type; and in a case where the sheet type designation information in the print job designates the automatic or the automatic detection, the sheet type automatic detection setting is enabled, and the sheet type in the setting for the feed unit is specified, control the printing to be performed on the sheet conveyed from the feed unit based on the specified sheet type without detecting the sheet type of the sheet on the feed unit on the conveyance path.

Configuration 2

The image forming apparatus according to configuration 1, the processor further configured to, in a case where the sheet type designation information in the print job designates the automatic detection, change the sheet type designation information from the automatic detection to the automatic.

Configuration 3

The image forming apparatus according to configuration 2, the processor is further configured to set the sheet type in the setting for the feed unit to unspecified in a case where no sheet is on the feed unit after the processor detects a sheet type of a sheet on the feed unit on a conveyance path, specifies the sheet type in the setting for the feed unit, and controls the printing to be performed on the sheet conveyed from the feed unit based on the specified sheet type or after the processor controls the printing to be performed on the sheet conveyed from the feed unit based on the specified sheet type without detecting the sheet type of the sheet on the feed unit on the conveyance path, wherein in a case where the sheet type designation information is changed from the automatic detection to the automatic, the sheet type designation information is returned from the automatic to the automatic detection.

Configuration 4

The image forming apparatus according to configuration 1, the processor further configured to, in a case where the sheet type designation information in the print job designates the automatic or the automatic detection and the sheet type automatic detection setting is disabled, control the printing to be performed on the sheet conveyed from the feed unit based on the sheet type in the setting for the feed unit.

Configuration 5

The image forming apparatus according to configuration 1, the processor further configured to, in a case where the sheet type designation information in the print job does not designate the automatic or the automatic detection and a sheet type designated by the sheet type designation information in the print job matches the sheet type in the setting for the feed unit, control the printing to be performed on the sheet conveyed from the feed unit based on the matched sheet type.

Configuration 6

The image forming apparatus according to any one of configurations 1, the processor further configured to, in a case where the sheet type designation information in the print job does not designate the automatic or the automatic detection and the sheet type designation information in the print job does not match the sheet type in the setting for the feed unit, perform control to display a sheet replacement request.

Configuration 7

The image forming apparatus according to configuration 1, the processor further configured to set the sheet type in the setting for the feed unit to unspecified in a case where no sheet is on the feed unit.

Configuration 8

The image forming apparatus according to configuration 1, the processor is further configured to set the sheet type in the setting for the feed unit to unspecified in a case where no sheet is on the feed unit after the processor detects a sheet type of a sheet on the feed unit on a conveyance path, specifies the sheet type in the setting for the feed unit, and controls the printing to be performed on the sheet conveyed from the feed unit based on the specified sheet type or after the processor controls the printing to be performed on the sheet conveyed from the feed unit based on the specified sheet type without detecting the sheet type of the sheet on the feed unit on the conveyance path.

Configuration 9

The image forming apparatus according to any one of configurations 1 to 8, wherein the automatic detection in the sheet type designation information is a setting that instructs the detection of the sheet type of the sheet on the feed unit to be performed, and wherein the automatic in the sheet type designation information is a setting that instructs the detection of the sheet type of the sheet on the feed unit not to be performed.

Configuration 10

The image forming apparatus according to any one of configurations 1 to 9, wherein the feed unit is a manual feed tray.

Configuration 11

The image forming apparatus according to any one of configurations 1 to 10, wherein the print job is in a page description language or a job control language.

Method 1

A method for controlling an image forming apparatus that controls printing based on a print job including sheet type designation information configured to designate at least automatic or automatic detection, the method comprising:

setting a sheet type automatic detection setting to enabled or disabled;

performing control to, in a case where the sheet type designation information in the print job designates the automatic or the automatic detection, the sheet type automatic detection setting is enabled, and a sheet type in a setting for a feed unit is unspecified, detect a sheet type of a sheet on the feed unit on a conveyance path, specify the sheet type in the setting for the feed unit, and control the printing to be performed on the sheet conveyed from the feed unit based on the specified sheet type; and performing control to, in a case where the sheet type designation information in the print job designates the automatic or the automatic detection, the sheet type automatic detection setting is enabled, and the sheet type in the setting for the feed unit is specified, control the printing to be performed on the sheet conveyed from the feed unit based on the specified sheet type without detecting the sheet type of the sheet on the feed unit on the conveyance path.

Program 1

A program for causing a computer to function as the image forming apparatus according to any one of configurations 1 to 11.

According to the present disclosure, a detection of a sheet type of a sheet on a feed unit as appropriate improves productivity.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-172225, filed Oct. 3, 2023, which is hereby incorporated by reference herein in its entirety.

What is claimed is:

1. An image forming apparatus that controls printing based on a print job including sheet type designation information configured to designate at least automatic or automatic detection, the image forming apparatus comprising:

at least one memory storing a program; and at least one processor, the at least one processor that when executing the program is configured to cause the image forming apparatus to:

set a sheet type automatic detection setting to enabled or disabled;

in a case where the sheet type designation information in the print job designates the automatic or the automatic detection, the sheet type automatic detection setting is enabled and a sheet type in a setting for a feed unit is unspecified, detect a sheet type of a sheet on the feed unit on a conveyance path, specify the sheet type in the setting for the feed unit, and control the printing to be performed on the sheet conveyed from the feed unit based on the specified sheet type; and in a case where the sheet type designation information in the print job designates the automatic or the automatic detection, the sheet type automatic detection setting is enabled, and the sheet type in the setting for the feed unit is specified, control the printing to be performed on the sheet conveyed from the feed unit based on the specified sheet type without detecting the sheet type of the sheet on the feed unit on the conveyance path.

2. The image forming apparatus according to claim 1, the processor further configured to, in a case where the sheet type designation information in the print job designates the automatic detection, change the sheet type designation information from the automatic detection to the automatic.

3. The image forming apparatus according to claim 2, the processor is further configured to set the sheet type in the setting for the feed unit to unspecified in a case where no sheet is on the feed unit after the processor detects a sheet type of a sheet on the feed unit on a conveyance path, specifies the sheet type in the setting for the feed unit, and controls the printing to be performed on the sheet conveyed from the feed unit based on the specified sheet type or after the processor controls the printing to be performed on the sheet conveyed from the feed unit based on the specified sheet type without detecting the sheet type of the sheet on the feed unit on the conveyance path, wherein in a case where the sheet type designation information is changed from the automatic detection to the automatic, the sheet type designation information is returned from the automatic to the automatic detection.

4. The image forming apparatus according to claim 1, the processor further configured to, in a case where the sheet type designation information in the print job designates the automatic or the automatic detection and the sheet type automatic detection setting is disabled, control the printing to be performed on the sheet conveyed from the feed unit based on the sheet type in the setting for the feed unit.

5. The image forming apparatus according to claim 1, the processor further configured to, in a case where the sheet type designation information in the print job does not designate the automatic or the automatic detection and a sheet type designated by the sheet type designation information in the print job matches the sheet type in the setting for the feed unit, control the printing to be performed on the sheet conveyed from the feed unit based on the matched sheet type.

6. The image forming apparatus according to claim 1, the processor further configured to, in a case where the sheet type designation information in the print job does not designate the automatic or the automatic detection and the sheet type designation information in the print job does not match the sheet type in the setting for the feed unit, perform control to display a sheet replacement request.

7. The image forming apparatus according to claim 1, the processor further configured to set the sheet type in the setting for the feed unit to unspecified in a case where no sheet is on the feed unit.

8. The image forming apparatus according to claim 1, the processor is further configured to set the sheet type in the setting for the feed unit to unspecified in a case where no sheet is on the feed unit after the processor detects a sheet type of a sheet on the feed unit on a conveyance path, specifies the sheet type in the setting for the feed unit, and controls the printing to be performed on the sheet conveyed from the feed unit based on the specified sheet type or after the processor controls the printing to be performed on the sheet conveyed from the feed unit based on the specified sheet type without detecting the sheet type of the sheet on the feed unit on the conveyance path.

9. The image forming apparatus according to claim 1, wherein the automatic detection in the sheet type designation information is a setting that instructs the detection of the sheet type of the sheet on the feed unit to be performed, and wherein the automatic in the sheet type designation information is a setting that instructs the detection of the sheet type of the sheet on the feed unit not to be performed.

10. The image forming apparatus according to claim 1, wherein the feed unit is a manual feed tray.

11. The image forming apparatus according to claim 1, wherein the print job is in a page description language or a job control language.

12. A method for controlling an image forming apparatus that controls printing based on a print job including sheet type designation information configured to designate at least automatic or automatic detection, the method comprising:

setting a sheet type automatic detection setting to enabled or disabled;

performing control to, in a case where the sheet type designation information in the print job designates the automatic or the automatic detection, the sheet type automatic detection setting is enabled and a sheet type in a setting for a feed unit is unspecified, detect a sheet type of a sheet on the feed unit on a conveyance path, specify the sheet type in the setting for the feed unit, and control the printing to be performed on the sheet conveyed from the feed unit based on the specified sheet type; and performing control to, in a case where the sheet type designation information in the print job designates the automatic or the automatic detection, the sheet type automatic detection setting is enabled, and the sheet type in the setting for the feed unit is specified, control the printing to be performed on the sheet conveyed from the feed unit based on the specified sheet type without detecting the sheet type of the sheet on the feed unit on the conveyance path.

13. A non-transitory computer readable storage medium for storing a program that causes an image forming apparatus that controls printing based on a print job including sheet type designation information configured to designate at least automatic or automatic detection to perform a method, the method comprising:

setting a sheet type automatic detection setting to enabled or disabled;

performing control to, in a case where the sheet type designation information in the print job designates the automatic or the automatic detection, the sheet type automatic detection setting is enabled and a sheet type in a setting for a feed unit is unspecified, detect a sheet type of a sheet on the feed unit on a conveyance path, specify the sheet type in the setting for the feed unit, and control the printing to be performed on the sheet conveyed from the feed unit based on the specified sheet type; and performing control to, in a case where the sheet type designation information in the print job designates the automatic or the automatic detection, the sheet type automatic detection setting is enabled, and the sheet type in the setting for the feed unit is specified, control the printing to be performed on the sheet conveyed from the feed unit based on the specified sheet type without detecting the sheet type of the sheet on the feed unit on the conveyance path.

* * * * *